(12) United States Patent
Tas

(10) Patent No.: US 6,834,759 B2
(45) Date of Patent: Dec. 28, 2004

(54) FLOWER SORTER

(75) Inventor: Johannes Cornelis J. Tas, Nootdorp (NL)

(73) Assignee: FPS Food Processing Systems B.V. (NL)

(*) Notice: Subject to any disclaimer, the term of this patent is extended or adjusted under 35 U.S.C. 154(b) by 0 days.

(21) Appl. No.: 10/359,296

(22) Filed: Feb. 6, 2003

(65) Prior Publication Data
US 2003/0150694 A1 Aug. 14, 2003

(30) Foreign Application Priority Data
Feb. 7, 2002 (EP) .......................................... 02075485

(51) Int. Cl.$^7$ ...................... B65G 17/44; B65G 29/00; B65G 37/00; B65G 47/84; B65G 47/86
(52) U.S. Cl. .................... 198/803.8; 209/577; 209/587; 209/592; 209/617; 700/223
(58) Field of Search .......................... 198/803.7, 803.8, 198/431, 355; 209/577, 587, 592, 617; 700/223

(56) References Cited

U.S. PATENT DOCUMENTS

| | | | |
|---|---|---|---|
| 3,598,234 A | * 8/1971 | Gregoire et al. | 209/43 |
| 3,645,394 A | * 2/1972 | Goodale | 198/355 |
| 3,659,709 A | * 5/1972 | Bartlett et al. | 209/551 |
| 5,157,899 A | 10/1992 | Tas | |
| 6,674,037 B2 | * 1/2004 | Ruigrok et al. | 198/803.7 |

FOREIGN PATENT DOCUMENTS

| | | |
|---|---|---|
| EP | 0 292 378 | 11/1988 |
| EP | 0 449 386 | 10/1991 |
| EP | 1 201 114 | 5/2002 |
| NL | 8500425 | 9/1986 |

* cited by examiner

Primary Examiner—Gene O. Crawford
(74) Attorney, Agent, or Firm—Marvin Petry, Esquire; Stites & Harbison PLLC

(57) ABSTRACT

An apparatus is provided for sorting flowers which includes a conveyor positioned in an endless conveyor chain having attached thereto, at predetermined intermediate distances, forks movable between at least two positions, a transport position and a hang-in position. The apparatus has at least a single detection station for determining at least a single corresponding characteristic of each flower, and a computer for recording the characteristic. In accordance with the characteristic, the apparatus delivers each flower at discharge stations. The apparatus further comprises at least a single hang-in buffer conveyor with an endless buffer transport element having buffer forks attached thereto, from which the flowers hanging therein are taken over by the forks, which the passing speed of the forks, $N_v$, and that of the buffer forks, $N_b$, meet $N_v > N_b$. In one form, the conveyor chain and the buffer transport element are driven, mutually coupled, with a control element. Advantageously, with this apparatus, flowers can be sorted fast in large quantities. In particular, even with manual hanging-in, a high filling capacity with a correspondingly high filling degree is obtained. In addition, such a buffer affords the possibility of hanging-in flowers from the site of cultivation, such as a glasshouse.

8 Claims, 1 Drawing Sheet

FLOWER SORTER

Figures 1, 1A:
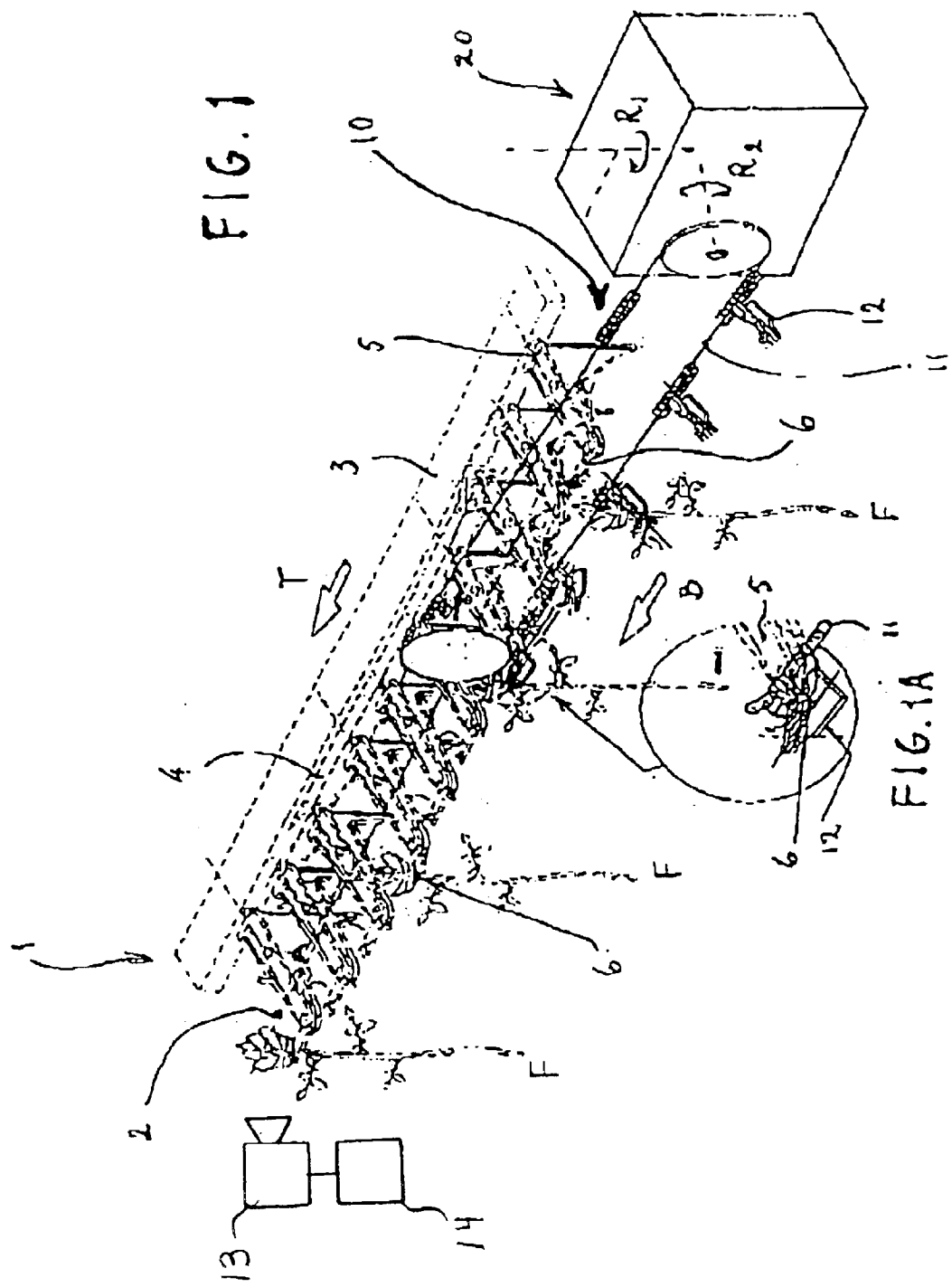

The present invention relates to a flower sorter, more specifically to an apparatus as set forth in the preamble of the main claim.

Such an apparatus is known, for instance from applicant's European patent application 01204055.6, disclosing a sorting apparatus which, having an improved fork transfer, is capable of taking over in particular several large flowers, such as roses, from, for instance, a fixedly arranged hang-in fork, and carries these flowers along the path of an endless conveyor chain along at least a single detection station and, after selection, delivers them at the proper position along the path, for instance to be bunched with other selected roses. The hang-in fork makes it possible for roses to be hung-in manually as well as to be hung in readiness. Although this results in a higher handling speed, this speed is limited by this very speed of manual hanging-in.

To provide a solution to that end, the apparatus according to the present invention is characterized in that the apparatus further comprises at least a single hang-in buffer conveyor with an endless buffer transport element having buffer forks attached thereto, from which the flowers hanging therein are taken over by the forks mentioned, while the passing speed of the forks, $N_v$, and that of the buffer forks, $N_b$, meet $N_v > N_b$.

What is thus achieved with great advantage is not only that manual hanging-in, and hence a careful handling of such delicate products, can be maintained, but especially that in this way a high degree of filling can be obtained by choosing, in accordance with the speed differences between the conveyor and the buffer conveyor, the correct number of these buffer conveyors.

A further elaboration of the apparatus according to the invention is characterized in that the conveyor chain and the buffer transport element are driven, while mutually coupled, with a control element, and more in particular that the buffer transport element comprises a buffer chain, and that the control element comprises a gear transmission coupling. In a suitable manner, thus, a direct coupling between on the one hand the traveling speeds and on the other hand the hang-in capacity and degree of filling has been accomplished.

Further details and a further explanation are given with reference to a drawing, in which FIG. 1 schematically shows a perspective view of an apparatus according to the invention, and FIG. 1A shows an enlarged detail of the view according to FIG. 1.

In the two figures, the same parts have the same reference characters.

The schematic view according to FIG. 1 shows a part of a sorting apparatus for flowers F, with a conveyor 1 having conveyor transport direction T, by which the flowers after being manually hung in buffer forks 12 of a hang-in buffer conveyor 10 having transport direction B, are taken over with forks 6 of the conveyor 1. After this take-over, these flowers F are generally passed along at least a single detection station 13 where, as a characteristic, for instance the stem length of each flower is determined, after which these data are stored in a computer 14, on the basis of which subsequently the selective delivery along a next part of the conveyor 1 controlled. Measured in each case at a fixed position, the number of forks 6 passing per second is denoted as $N_v$, and the number of buffer forks 12 passing per second is denoted as $N_b$.

The forks 6 of the conveyor 1 form part of arm-fork units 5 which are described in detail in the above-mentioned European patent application 01204055.6. These units are connected, at generally fixed intermediate distances, to an endless conveyor chain 2, schematically indicated in the figure, which is driven in a horizontal plane in a direction of rotation R1. More particularly, there is shown the part of the sorting apparatus that functions as presenting element 3, whereby the arm-fork units 5, at the command of, for instance, the above-mentioned computer, are passed via a profiled piece 4 with the fork in the correct position to the correct position along the hang-in buffer conveyor 10.

The buffer forks 12 of the hang-in buffer conveyor 10 are connected, generally at fixed intermediate distances, to an endless buffer transport element, such as, for instance, a buffer chain 11, which is driven in direction of rotation R2. This direction of rotation is generally not located in a horizontal plane. In the figure, a substantially vertical plane is indicated, but other directions are also possible. Also, different types of transport elements, such as belts of metal or plastic, can be used for this purpose. Such belts can be utilized with great advantage in the case of very long paths, for instance starting from the cultivation site, more particularly fixed hang-in stations in a glasshouse. This yields a considerable saving on operations and transport from such glasshouses, which can cover considerable floor surfaces and thus entail great transport distances.

In FIG. 1, and in more detail in FIG. 1A, it is further indicated how such a buffer fork 12 is rotated to the proper take-over position, so that a flower F hanged therein can be carried along with a fork 6 without being damaged. It will be clear to anyone skilled in the art that there are many ways of rotating a fork in this way. Furthermore, it is noted that the proper position of the forks 6 is for instance achieved as described, for instance, in the above-mentioned European patent application 01204055.6. The positions of the two forks during take-over of a flower F are represented in detail in FIG. 1A.

As already indicated above, it has been found that manually hanging flowers in the forks 6 of conveyor 1 yields an insufficient degree of filling at high passing speeds $N_v$ of the forks 6. With at least a single buffer conveyor 10, for instance in combination with manual hanging-in, while selecting the passing speed $N_b$ of the buffer forks 12 of the buffer conveyor 10 to be significantly lower than that of the conveyor 1, a sufficient degree of filling can be obtained. To obtain a still further or even fully automated filling, several buffer conveyors 10 can be arranged in line along such a conveyor 1.

According to the invention, the conveyor and the at least single buffer conveyor are, coupled, driven by a chain control element accommodated, for instance, in a chain control box 20, as schematically shown in FIG. 1. In particular, this coupling can comprise a gear transmission coupling, with well-selected transmission ratios of the associated respective chains, for instance a ratio r=3. Given equal intermediate distances of the forks in the two chains, it can then be seen that each third fork 6 can take over a flower F from a buffer fork 12, in which case $N_v = 3 N_b$. It will be clear that depending on such dimensioning any other combination is possible.

It will be clear to any skilled person that further small modifications within the scope of the appended claims are possible. Thus, many controls other than couplings in gear boxes will be possible. This should specifically be understood to include separate drives controlled directly with a computer. Furthermore, it will be clear that further fork movements, not represented in detail here, can improve handling of the flowers F, in particular understood to include fork movements which in case of failure of take-over will not cause an interruption of the ongoing movement of conveyor 1, but will prevent such interruptions.

What is claimed is:

1. An apparatus for sorting flowers, said apparatus comprising:
   a conveyor with an endless conveyor chain positioned in a horizontal plane;
   forks movable between at least two positions attached to the conveyor at predetermined intermediate distances;
   a single detection station for determining at least one characteristic of each flower to be sorted;
   a computer for recording the at least one characteristic, and, in accordance therewith, delivering each flower at discharge stations arranged for that purpose;
   at least one hang-in buffer conveyor with an endless buffer transport element having buffer forks attached thereto, from which the flowers hanging therein are taken over by said forks, while the passing speed of the forks, $N_v$, and that of the buffer forks, $N_b$, meet $N_v > N_b$;
   a control element mutually coupling and driving the conveyor chain and the buffer element transport element.

2. An apparatus according to claim 1, wherein the buffer transport element comprises a buffer chain, and that the control element comprises a gear transmission coupling.

3. An apparatus according to claim 1, wherein the passing speeds of the respective forks are in the ratio of $N_v = 3 N_b$.

4. An apparatus according to claim 1, wherein the buffer transport of flowers from a cultivation site takes place.

5. An apparatus for sorting flowers, said apparatus comprising:
   a conveyor with an endless conveyor chain positioned in a horizontal plane;
   forks movable between at least two positions attached to the conveyor at predetermined intermediate distances;
   a single detection station for determining at least one characteristic of each flower to be sorted; and
   a computer for recording the at least one characteristic, and, in accordance therewith, delivering each flower at discharge stations arranged for that purpose;
   at least one hang-in buffer conveyor with an endless buffer transport element having buffer forks attached thereto, from which the flowers hanging therein are taken over by said forks, while the passing speed of the forks, $N_v$, and that of the buffer forks $N_b$, are in the ratio $N_v = 3N_b$.

6. An apparatus according to claim 5, wherein the buffer transport of flowers from a cultivation site takes place.

7. An apparatus according to claim 5, wherein the conveyor chain and the buffer transport element are driven, mutually coupled, with a control element.

8. An apparatus according to claim 7, wherein the buffer transport element comprises a buffer chain, and that the control element comprises a gear transmission coupling.

* * * * *